(12) United States Patent
Mandel et al.

(10) Patent No.: US 7,837,193 B2
(45) Date of Patent: Nov. 23, 2010

(54) SYSTEMS AND METHODS FOR REDUCING REGISTRATION ERRORS IN TRANSLATING MEDIA SHAFT DRIVE SYSTEMS

(75) Inventors: Barry Paul Mandel, Fairport, NY (US); Lloyd A. Williams, Mahopac, NY (US)

(73) Assignee: Xerox Corporation, Norwalk, CT (US)

( * ) Notice: Subject to any disclaimer, the term of this patent is extended or adjusted under 35 U.S.C. 154(b) by 909 days.

(21) Appl. No.: 11/692,459

(22) Filed: Mar. 28, 2007

(65) Prior Publication Data

US 2008/0237974 A1    Oct. 2, 2008

(51) Int. Cl.
  B65H 9/16    (2006.01)
(52) U.S. Cl. .................. 271/249; 271/250; 271/252
(58) Field of Classification Search ............... 271/249, 271/250, 252, 272, 207; 414/791.2; 464/182
  See application file for complete search history.

(56) References Cited

U.S. PATENT DOCUMENTS

| | | | | |
|---|---|---|---|---|
| 2,514,394 | A * | 7/1950 | Irving | 464/57 |
| 3,068,665 | A * | 12/1962 | Firth | 464/80 |
| 3,250,090 | A * | 5/1966 | Thompson | 464/80 |
| 3,283,535 | A * | 11/1966 | Grundtner | 464/80 |
| 3,385,080 | A * | 5/1968 | Sorenson | 464/49 |
| 3,988,906 | A | 11/1976 | Smith | |
| 5,094,442 | A | 3/1992 | Kamprath et al. | |
| 5,219,159 | A | 6/1993 | Malachowski et al. | |
| 5,273,274 | A | 12/1993 | Thomson et al. | |
| 5,278,624 | A | 1/1994 | Kamprath et al. | |
| 5,337,133 | A | 8/1994 | Siegel et al. | |
| 5,513,839 | A * | 5/1996 | Green | 270/58.07 |
| 5,678,159 | A | 10/1997 | Williams et al. | |
| 5,794,176 | A | 8/1998 | Milillo | |
| 5,848,344 | A | 12/1998 | Milillo et al. | |
| 6,287,207 | B1 | 9/2001 | Rui et al. | |
| 6,533,268 | B2 | 3/2003 | Williams et al. | |
| 6,799,013 | B2 * | 9/2004 | Shin | 399/405 |
| 6,866,260 | B2 | 3/2005 | Williams et al. | |
| 7,108,261 | B2 * | 9/2006 | Murakami et al. | 271/314 |
| 7,159,862 | B2 * | 1/2007 | Matsutomo et al. | 271/3.14 |
| 2003/0059239 | A1 | 3/2003 | Shin | |

FOREIGN PATENT DOCUMENTS

| | | |
|---|---|---|
| EP | 1 389 600 A1 | 2/2004 |
| JP | A-05-069982 | 3/1993 |

OTHER PUBLICATIONS

Dec. 9, 2009 European Search Report issued in EP 08 15 1992.

* cited by examiner

Primary Examiner—David H Bollinger
(74) Attorney, Agent, or Firm—Oliff & Berridge, PLC

(57) ABSTRACT

Systems and methods for positioning a sheet in a feed path including at least one sheet drive roller driven in a rotational direction by a drive shaft in which the drive shaft translates in a lengthwise direction along the axis of the drive shaft. A power shaft rotates about the same axis as the drive shaft and is driven by a power source that is fixedly mounted in the system. The power shaft is fixed to the drive shaft by a flexible coupling that allows the drive shaft and the power shaft to move relative to one another in the lengthwise direction along the axis while maintaining corresponding rotational motion between the power shaft and the drive shaft.

19 Claims, 6 Drawing Sheets

SYSTEMS AND METHODS FOR REDUCING REGISTRATION ERRORS IN TRANSLATING MEDIA SHAFT DRIVE SYSTEMS

This disclosure relates to sheet registration systems in image forming devices, and specifically to systems and methods for reducing sheet registration errors in translating media shaft drive systems.

BACKGROUND

Sheet aligning mechanisms in image forming devices use a variety of methods for registering sheets in process (forward), lateral (side-to-side), and skew (rotation) directions. Precise registration is important for reliable and accurate image production and/or reproduction.

Sheet handling and registration systems today can perform all three registration functions nearly simultaneously and with sheets moving along a paper path at a controlled speed, without sheet stoppages. This is otherwise known as in-process sheet registration, or more colloquially, sheet registration "on the fly." The requirement advantageously to conduct sheet printing operations at ever increasing speeds challenges conventional sheet handling and registration systems. An ability to achieve a desired sheet skew rotation, sheet lateral movement, and forward sheet speed adjustment during ever briefer time periods presents unique challenges in various systems.

Conventional systems use two high-power servo-motors or step motors for driving a laterally spaced pair of separate sheet driving nips. Motors mounted on transversely-movable carriage assemblies with respect to the feed path to achieve both skew and lateral adjustment add significant proportional weight to the carriage. This additional weight makes it difficult to control rapid movement as may be required for lateral adjustment.

SUMMARY

Related methods remove the motors from the traversing carriage. This reduces the weight of the carriage, allowing quicker and more accurate lateral response.

A current solution, however, has its drawbacks. These systems in which drive motors are separate from the carriage carrying the drive shaft and drive nips use elongated gears that communicate drive power from the drive motors to a drive shaft. A relatively long gear on the drive shaft moves laterally across a smaller gear connected to a fixed motor. Such designs can suffer from backlash and/or transitional delay between the gears due to clearances between teeth of the gears and/or wear of the gears and mounting hardware. Even small clearances or other gaps can translate to undesirable deviations in sheet registration, imprecise translation of drive forces and/or backlash.

FIG. 9 depicts a related system in which a narrow sear 70 is mated with a traversing gear 80 that is fixed to a drive shaft 16. Carriage 12 moves relative to the drive motors 20 in the direction indicated by arrow D. In such a system, clearances between the individual teeth of gears 70 and 80 may allow for inaccuracies in the translation of drive forces and/or undesirable backlash. Further, as the gears 70 and 80 wear, these effects may be increased, thus requiring replacement of the parts in order for effective functioning of the registration device.

In such systems, attempts to reduce clearance and/or backlash by increasing contact pressure in the gear system also increases functional forces that restrain the lengthwise movement of the gears. The effects of such frictional forces can be significant, particularly in light of the gear structure that, for every lengthwise movement of the drive shaft 16 in the axial direction, a frictional movement of equal distance is created along the teeth of gear 70.

In view of the foregoing, it would be desirable to provide systems and methods whereby backlash would be reduced and/or communication of drive forces enhanced between power shafts and drive shafts in sheet handling and registration systems while motors driving such shafts remain stationary.

Disclosed systems and methods may provide a translating shaft drive system for use in sheet handling and registration systems that allow the system to translate while the drive motors remain stationary, thus allowing relatively low carriage mass and fast carriage return times, while providing reduced backlash and resultant registration errors. This may be accomplished via a coupling that fixes a drive shaft to a power shaft in a rotational direction while allowing relative movement between the shafts in a lengthwise direction.

Disclosed systems and methods may include couplings with structures that reduce frictional movement within, or at connection points of, the coupling caused by relative movement of the shafts in a lengthwise direction while maintaining accurate position in a rotational direction.

In various exemplary embodiments, the coupling may comprise at least two pieces that are joined to each other at ends of the pieces. At least one of the pieces may be fixed to a drive shaft and at least another of the pieces may be fixed to a power shaft.

In various exemplary embodiments, the pieces may be substantially rectangular and joined together at short sides of the pieces. Additionally, the pieces may be substantially flat.

In various exemplary embodiments, the pieces may be substantially circular and joined together substantially along the circumference of the pieces. Additionally, either or both of the pieces may include a concave portion on the mating surface.

In various exemplary embodiments, the coupling may include at least two bending links, each bending link having two ends. Each of the two ends of the respective bending links is fixed in the rotational direction to one of the respective power shaft or drive shaft. In various exemplary embodiments, the structure of the coupling may be such that relative movement of the shafts in a lengthwise direction causes negligible frictional movement in the coupling in the lengthwise direction.

In various exemplary embodiments, the coupling may comprise at least one flexible substantially hollow structural member fixed to the drive shaft or the power shaft and/or one compressible torsionally-rigid substantially solid structural member.

These and other objects, advantages and features of the systems and methods according to this disclosure are described and/or are apparent from, the following description of exemplary embodiments.

BRIEF DESCRIPTION OF THE DRAWINGS

Various exemplary embodiments of the disclosed systems and methods will be described, in detail, with reference to the following figures, wherein.

DETAILED DESCRIPTION OF EMBODIMENTS

Although embodiments of disclosed systems and methods are designed in view of specific exemplary use in a translating shaft drive system for sheet handling and registration units in image forming devices, and specifically xerographic image forming devices, the disclosed systems and methods are equally applicable to any shaft drive systems in which radial stiffness is provided while allowing low-friction axial motion of the system particularly with respect to one or more fixedly mounted drive systems.

Figure 1:
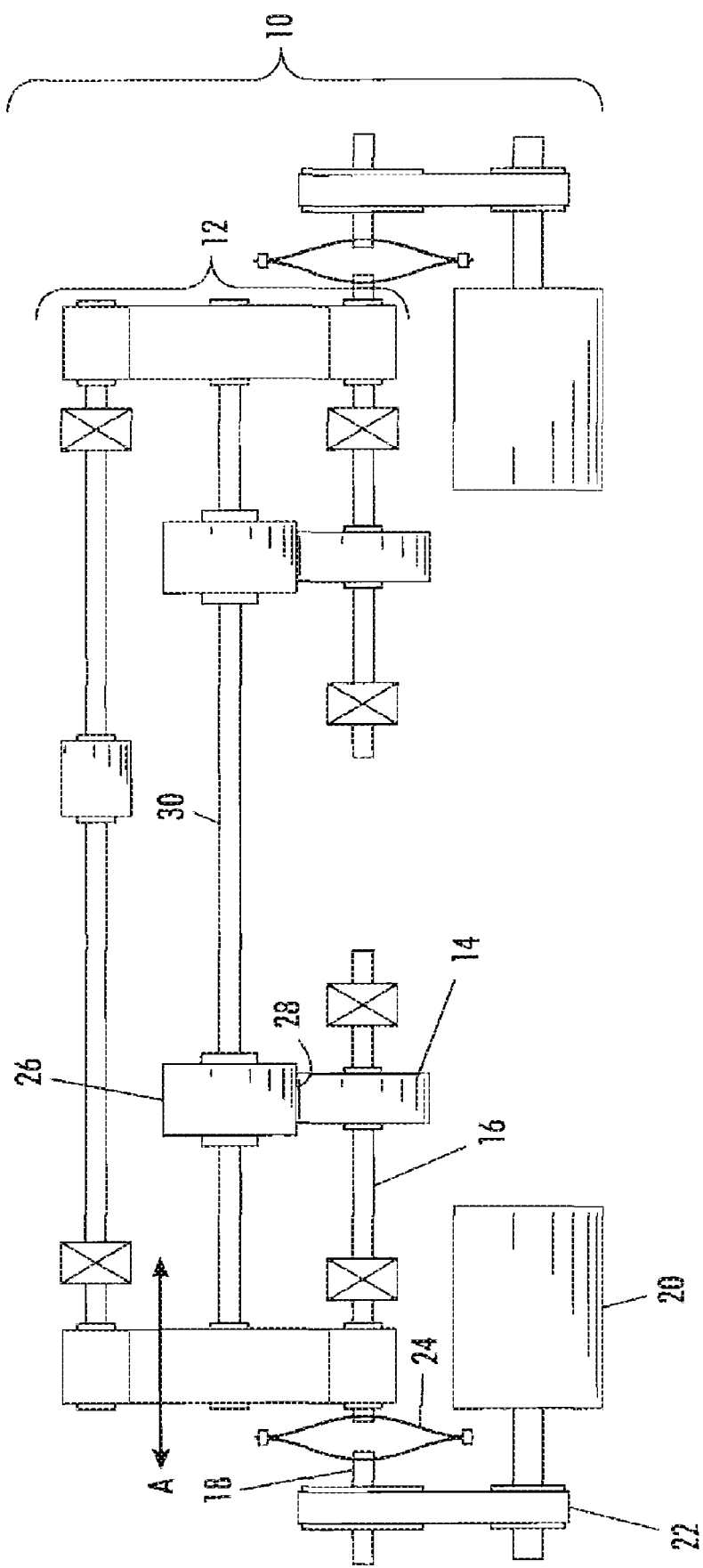
FIG. 1 illustrates a first exemplary embodiment of a translating shaft drive system according to this disclosure.
Figure 2:
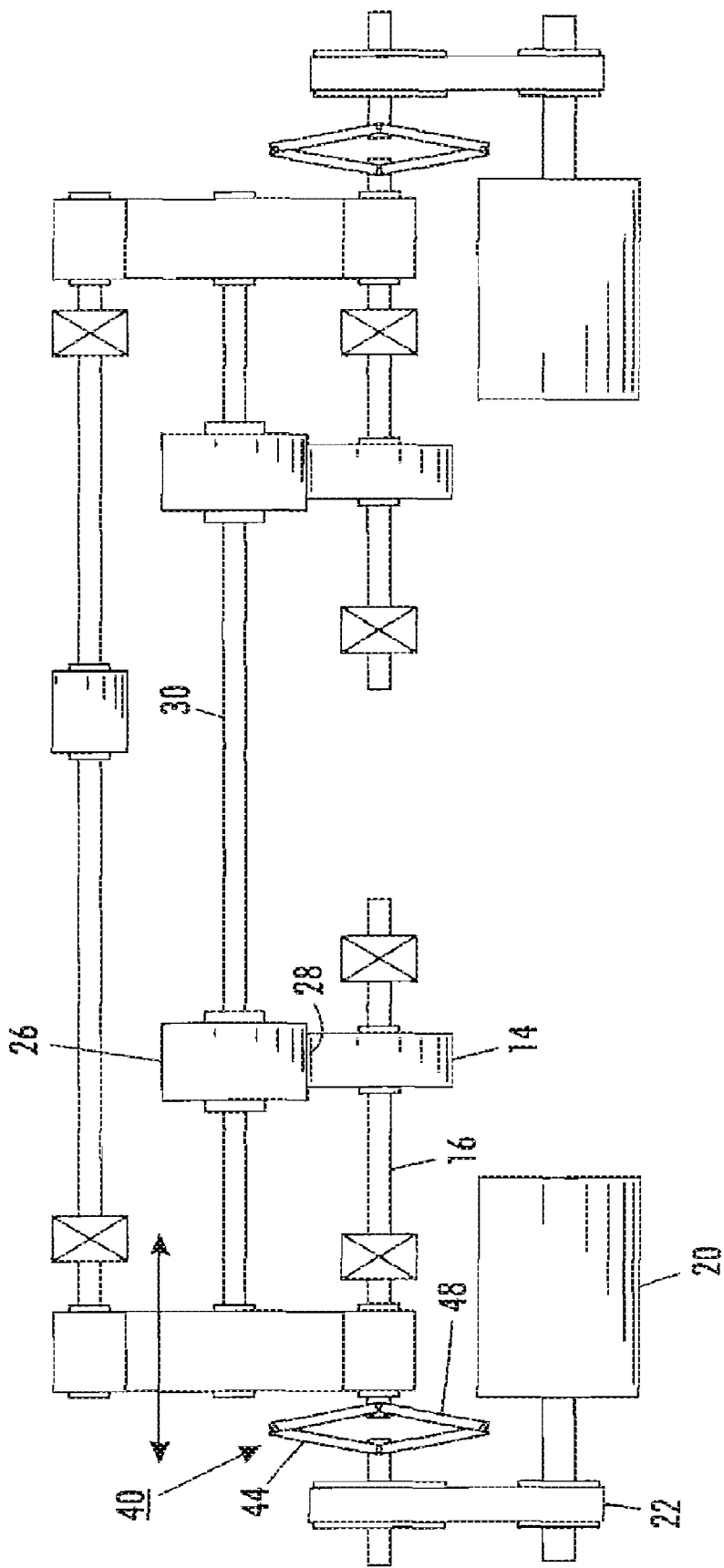
FIG. 2 illustrates a second exemplary embodiment of a translating shaft drive system according to this disclosure.

FIG. 1 illustrates a first exemplary embodiment of a translating shaft drive system according to this disclosure. The system 1 places a sheet into proper alignment or registration for downstream processing. As shown in FIG. 2, the exemplary system 1 may include a registration unit 10 that in turn may include a carriage 12 having two drive rolls 14. The drive rolls 14 may be driven by drive motors 20. The rotary output of each motor 20 may be transmitted to a power shaft 18 by a suitable power transmission unit such as, for example, belts 22, or the drive motors 20 may be directly connected to power shaft 18 in a configuration that is not shown.

Figure 3:
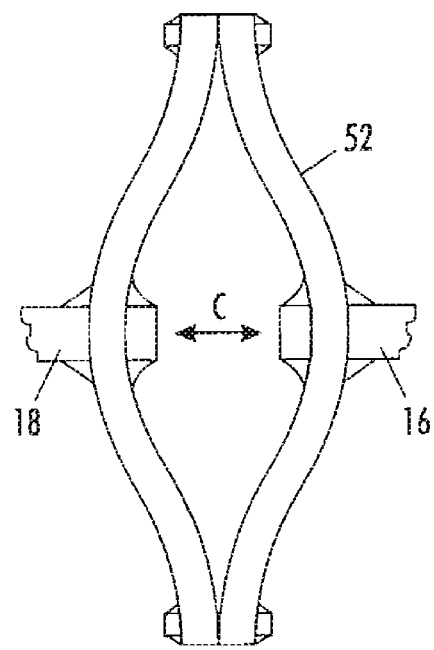
FIG. 3 illustrate a first exemplary embodiment of a coupling for use in a translating shaft drive system according to this disclosure.

The power shafts 18 may in turn transmit power to drive shafts 16 via couplings 24. As depicted in FIG. 1, couplings 24 may be formed by joining two pieces 52 formed of relatively thin sheets of material such as, for example, metal, at or near the ends of the pieces 52. The power shaft 18 and drive shaft 16 may each be fixed in a rotational direction to a center portion of a piece 52, respectively. As such, a rotational correlation of the power shaft 18 to the drive shaft 16 is intended to be maintained (see FIG. 3).

Figure 9:
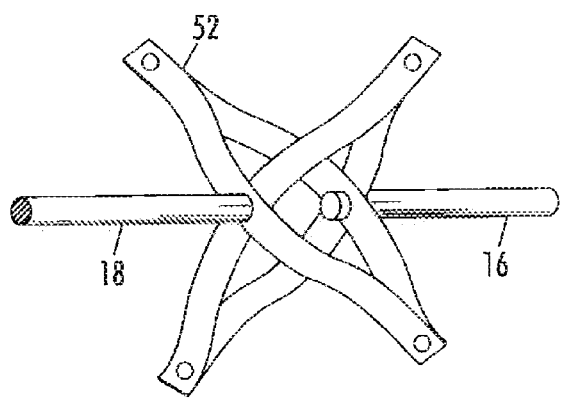
FIG. 9 illustrates a fifth exemplary embodiment of a coupling for use in a translating shaft drive system according to this disclosure.

It should be appreciated that, although depicted with two pieces 52, exemplary embodiments of the coupling may include more than two pieces, joined in similar fashion. For example, four pieces 52 could be joined in the form of an X, with two pieces 52 fixed to the power shaft 18 and two other pieces 52 fixed to the drive shaft 16 (see FIG. 9). It should also be appreciate that the depicted pieces 52 are exemplary and not limiting to the shape, size or configuration of pieces or couplings contemplated by this disclosure. For example, individual pieces may vary in shape and size and/or be combined with other disclosed structural components of exemplary couplings without departing from the scope of this disclosure.

Referring back to FIG. 1, drive rolls 14 are fixedly mounted on each of the drive shafts 16. Adjacent to, and in pressure contact with, drive rolls 14 may be rotatably mounted by suitable means nip rolls 26. The nip rolls 26 may be commonly coaxially mounted for rotation about the axis of a cross shaft 30 which is mounted on the carriage 12. The roll pairs 26, 14 may engage a sheet by nip 28 and drive it through the registration unit 10.

The carriage 12 may be mounted for movement transversely of the direction of feed, as indicated by arrow A, while the motors 20 are otherwise fixedly mounted.

The structure depicted in FIG. 1 allows the carriage 12 to move transversely through a range without moving the motors 20 or power shafts 18. Couplings 24 also accurately translate the power provided by power shafts 18 to drive shafts 16 and drive nips 14 while providing negligible impediment to the movement of the carriage 12 in the transverse direction A.

Figure 5:
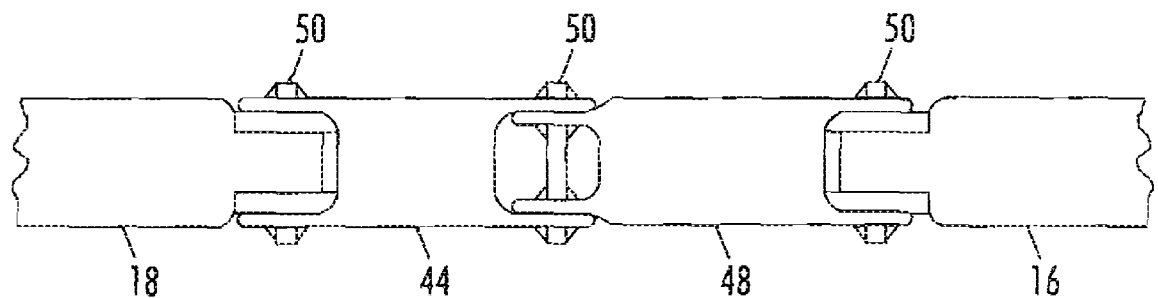
FIGS. 5 and 6 illustrate perspective views of the second exemplary embodiment of a coupling shown in FIG. 4.
Figure 6:
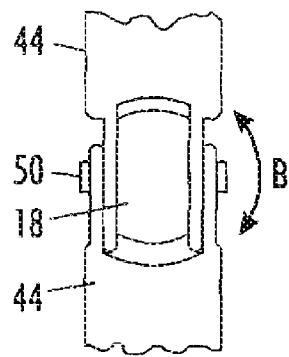

FIG. 2 illustrates a second exemplary embodiment of a translating shaft drive system according to this disclosure. Similar components to those depicted, in FIG. 1 are labeled in like manner in FIG. 2. As shown in FIG. 2, a second exemplary coupling joining power shaft 18 to drive shaft 16 is depicted. Two bending links 40 are shown. Each bending link 40 may include rigid members 44, 48, which may translate the power provided by power shafts 18 to drive shaft 16 and drive nips 14 while providing negligible impediment to the movement of the carriage 12 in the transverse direction A. A more detailed view of aspects of exemplary coupling are depicted in FIGS. 4-6.

Figure 4:
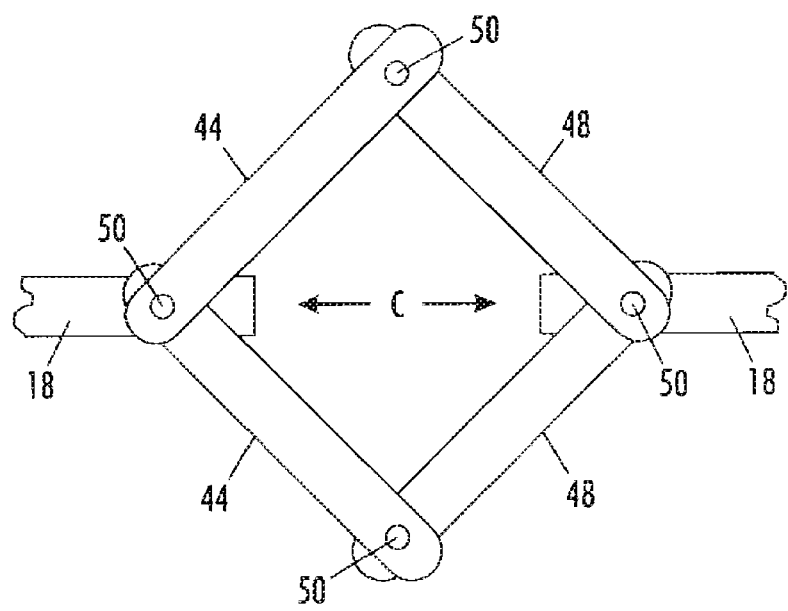
FIG. 4 illustrates a second exemplary embodiment of a coupling for use in a translating shaft drive system according to this disclosure.

According to this second embodiment, and as shown in FIG. 4, one end of each rigid member 44 may be fixed in a rotational direction to power shaft 18. Such fixing may be accomplished via press fitting pins 50, as depicted in FIG. 6. This may fix ends of each rigid member 44 to the power shaft 18 in a rotational direction, represented by arrow B. The other of the ends of each rigid member 44 may be similarly joined to a cooperating end of each rigid member 48, as depicted in FIGS. 4 and 5. The other of the ends of rigid members 48, opposite the cooperating ends joined to rigid members 44, may be fixed to the drive shaft 16 in a similar manner to the fixing of each rigid member 44 to the power shaft 18. Thus, accurate translation of the rotation of power shaft 18 may be communicated to drive shaft 16 while still allowing translational movement of power shaft 18 and drive shaft 16 in the direction indicated by arrow C in FIG. 4.

Figure 7:
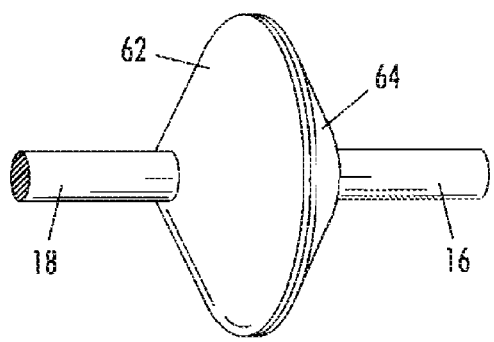
FIG. 7 illustrates a third exemplary embodiment of a coupling for use in a translating shaft drive system according to this disclosure.

FIG. 7 illustrates a third exemplary embodiment of a coupling for use in a translating shaft drive system according to this disclosure. In this embodiment, the pieces of the coupling are two substantially circular flexible cups 62, 64. The cups 62, 64 are connected to power shaft 18 and drive shaft 16, respectively, and joined substantially around the circumference of the cups. Compression or expansion of either or both of the cups 62, 64 allows translational movement of power shaft 18 and drive shaft 16 while still accurately communicating rotation of power shaft 18 to drive shaft 16 via the torsional rigidity of the cups 62, 64.

Figure 8:
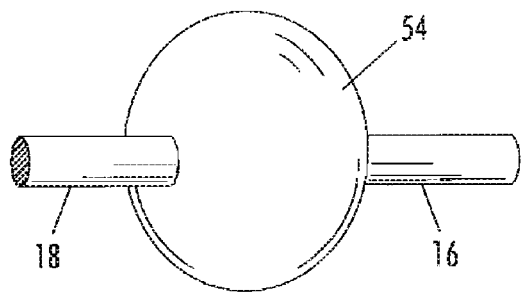
FIG. 8 illustrates a fourth exemplary embodiment of a coupling for use in a translating shaft drive system according to this disclosure.

FIG. 8 illustrates a fourth exemplary embodiment of a coupling for use in a translating shaft drive system according to this disclosure. In this embodiment, the coupling includes a structural portion 54, fixed to the drive shaft and the power shaft, formed of a flexible, substantially hollow, spheroid, or a compressible torsionally-rigid substantially solid spheroid. It should be appreciated that these shapes are exemplary and not limiting of the shapes, configurations or combinations that disclosed embodiments may include. Compression or expansion of the structural portion 54 allows translational movement of power shaft 18 and drive shaft 16 while still accurately communicating rotation of power shaft 18 to drive shaft 16 via the torsional rigidity of the structural portion 54.

It should be appreciated that, in depicted exemplary embodiments, frictional movement of individual components within, or at connection points of, the coupling caused by translational movement of the drive shaft 16 is less than the distance of the translational movement. For example, as depicted in FIG. 2, a rigid member 44, attached to the power shaft 18 and a second rigid member 48, may rotate relative to the power shaft based on translational movement of the drive shaft 16. However, the distance of any frictional movement between the contact surfaces of the rigid member 44 and the power shaft 18 is less than the distance of the translational movement of drive shaft 16. Other exemplary couplings may facilitate relative movement of the drive shaft and the power shaft in a longitudinal direction along the axis with negligible, or no, frictional movement in the coupling (see FIGS. 3 and 7-9).

Figure 10:
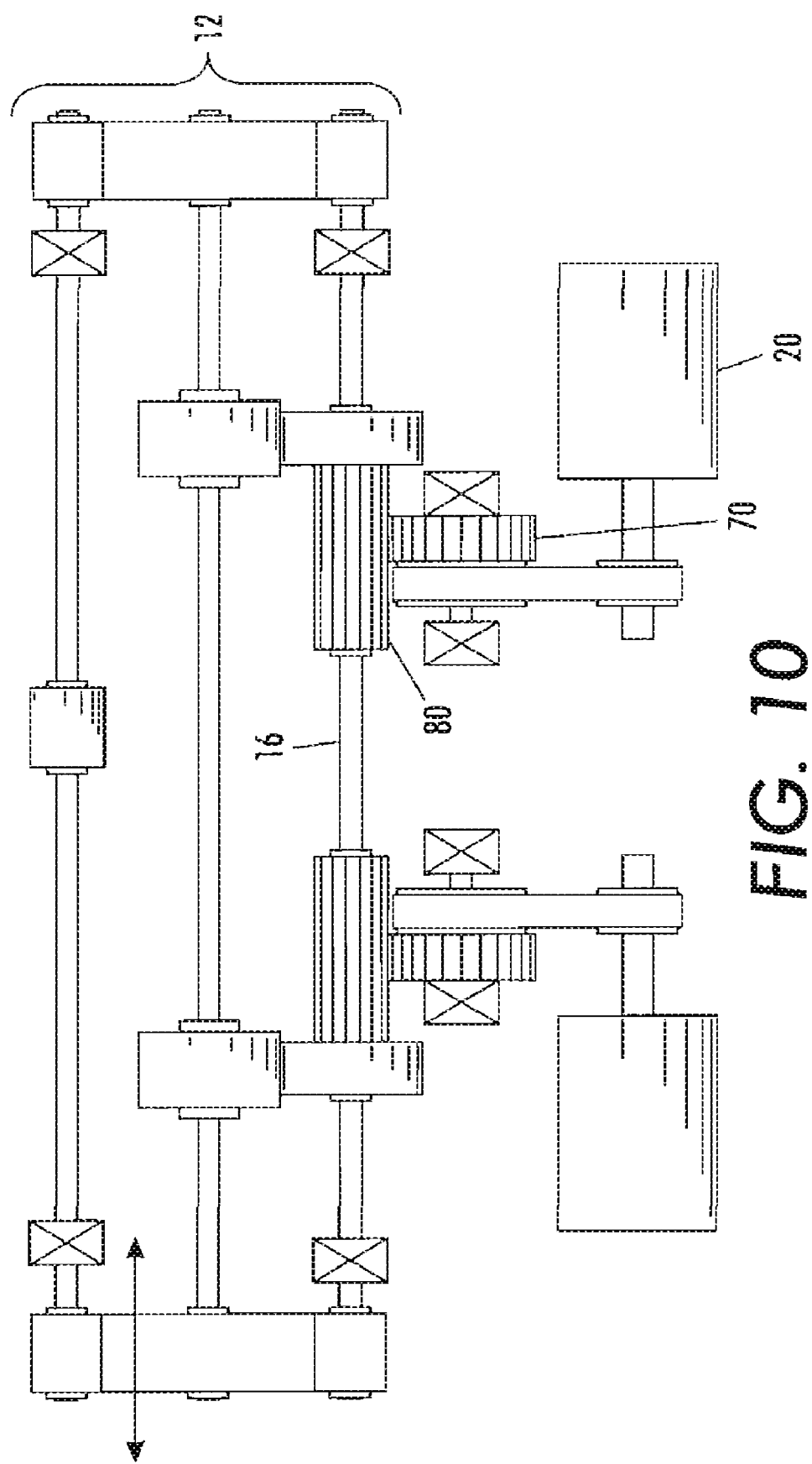
FIG. 10 illustrates a related art translating shaft drive system.

The couplings depicted in FIGS. 1-9, may enhance translation of drive forces and/or reduced backlash over related systems as depicted in FIG. 10 described above.

It should be appreciated that various of the above-disclosed and other features and functions, or alternatives thereof, may be desirably combined and/or used in many other different systems or applications. Individual exemplary coupling components may be combined in a variety of manners with other disclosed exemplary coupling components without departing from the scope of this disclosure. Also, various presently unforeseen or unanticipated alternatives, modifications, variations or improvements therein may be subsequently made by those skilled in the art, and are also intended to be encompassed by the following claims.

What is claimed is:

1. A system for positioning a sheet in a feed path, comprising:
   at least one sheet drive roller that cooperates with at least one opposing rolling member to provide a nip through which a sheet is made to pass;
   at least one drive shaft that rotates about an axis that drives the at least one sheet drive roller, the at least one drive shaft and the at least one sheet drive roller being able to translate in a lengthwise direction along the axis;
   at least one power shaft that rotates about the axis; and
   at least one coupling that is flexible in the longitudinal direction along the axis that fixes the drive shaft to the power shaft to impart substantially corresponding rotational motion from power shaft to the drive shaft while allowing relative movement between the shafts in the longitudinal direction along the axis.

2. The system of claim 1, wherein the coupling further comprises:
   at least two thin elongated structural members joined together at opposite elongated ends of the members,
   wherein at least one of the at least two thin elongated structural members is fixed to the drive shaft, and at least another one of the at least two thin elongated structural members is fixed to the power shaft.

3. The system of claim 2, wherein each of the at least one of the at least two thin elongated structural members and the at least another one of the at least two thin elongated structural members has a substantially constant thickness and is bowed in a direction of flexion.

4. The system of claim 1, wherein the coupling further comprises at least one cupped structural member fixed to the drive shaft or the power shaft.

5. The system of claim 4 wherein the at least one cupped structural member is fixed to the drive shaft and another cupped structural member is fixed to the power shaft and the at least one cupped structural and another cupped structural members are fixed to each other substantially along an outer circumference of the at least one cupped structural and another cupped structural members.

6. The system of claim 1, wherein the coupling further comprises at least one flexible substantially hollow structural member fixed to the drive shaft or the power shaft.

7. The system of claim 1, wherein the coupling further comprises at least one compressible torsionally-rigid solid structural member.

8. The system of claim 1, wherein the coupling comprises:
   at least two bending links, each bending link comprising at least two rigid members flexibly connected to one another,
   wherein a free end of each of the bending links is fixed in a rotational direction to the power shaft and another free end of each of the bending links is fixed in a rotational direction to the drive shaft.

9. The system of claim 1, wherein the coupling facilitates relative movement of the drive shaft and the power shaft in a longitudinal direction along the axis with negligible frictional movement in the coupling.

10. The system of claim 1 wherein the coupling facilitates relative movement of the drive shaft and the power shaft in a longitudinal direction along the axis with no frictional movement in the coupling greater than or equal to a distance of the relative movement of the shafts.

11. The system of claim 1, wherein the coupling flexes to allow relative movement between the drive shaft and the power shaft in a longitudinal direction along the axis.

12. A translating shaft sheet drive mechanism in an image forming device comprising the system according to claim 1.

13. The system of claim 12 wherein the lengthwise movement of the at least one drive shaft and the at least one sheet drive roller facilitates accurate registration of a formed image on the sheet in the image forming device.

14. A translating shaft sheet drive mechanism in a xerographic image forming device comprising the system according to claim 1.

15. The system of claim 1 wherein the at least one sheet drive roller, at least one drive shaft and at least one coupling are mounted on a carriage.

16. A method for positioning a sheet in a feed path, comprising:
   cooperating at least one sheet drive roller with at least one opposing rolling member to provide a nip through which a sheet is made to pass;
   driving the at least one sheet drive roller with a drive shaft that rotates about an axis and is fixed to the at least one sheet drive roller;
   driving a power shaft about the axis; and
   fixing the drive shaft to the power shaft in a rotational direction by a coupling that is flexible in the longitudinal direction along the axis that fixes the drive shaft to the power shaft to impart substantially corresponding rotational motion from the power shaft to the drive shaft while allowing relative movement between the drive and power shafts in the longitudinal direction along the axis.

17. The method of claim 16, wherein the fixing the drive shaft further comprises:
   joining together at least two thin elongated structural members at opposite elongated ends of the at least two thin elongated structural members,
   wherein at least one of the members is fixed to the drive shaft, and at least another one of the members is fixed to the power shaft.

18. The method of claim 16, wherein the fixing the drive shaft further comprises:

connecting flexibly at least two rigid members to one another, the at least two rigid members included in each of at least two bending links,
wherein a free end of each of the at least two bending links is fixed in a rotational direction to the power shaft and another free end of each of the at least two bending links is fixed in a rotational direction to the drive shaft.

19. The method of claim 16, wherein the fixing the drive shaft further comprises:

facilitating relative movement of the drive shaft and the power shaft in a longitudinal direction along the axis with no frictional movement in the coupling greater than or equal to a distance of the relative movement of the drive and power shafts.

\* \* \* \* \*